United States Patent
Albrecht

(10) Patent No.: US 7,848,047 B2
(45) Date of Patent: *Dec. 7, 2010

(54) PATTERNED MEDIA MAGNETIC RECORDING DISK DRIVE WITH WRITE CLOCK PHASE ADJUSTMENT FOR DATA PATTERN CIRCUMFERENTIAL MISALIGNMENT

(75) Inventor: Thomas R. Albrecht, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 464 days.

This patent is subject to a terminal disclaimer.

(21) Appl. No.: 12/056,178

(22) Filed: Mar. 26, 2008

(65) Prior Publication Data

US 2009/0244765 A1 Oct. 1, 2009

(51) Int. Cl.
*G11B 21/02* (2006.01)
(52) U.S. Cl. ........................................ 360/75
(58) Field of Classification Search ................. None
See application file for complete search history.

(56) References Cited

U.S. PATENT DOCUMENTS

| | | | |
|---|---|---|---|
| 6,421,195 B1 | 7/2002 | Rubin et al. | |
| 6,738,207 B1 | 5/2004 | Belser et al. | |
| 6,754,017 B2 | 6/2004 | Rettner et al. | |
| 6,798,594 B2 | 9/2004 | Belser | |
| 2006/0193070 A1 | 8/2006 | Bandic et al. | |

FOREIGN PATENT DOCUMENTS

JP 2003157507 5/2003

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

*Primary Examiner*—Kin C. Wong
(74) *Attorney, Agent, or Firm*—Thomas R. Berthold

(57) ABSTRACT

A patterned-media magnetic recording disk drive compensates for circumferential misalignment of data island patterns among the data tracks as a result of errors in fabrication of the master template used to make the disks. Each data track on the disk has its pattern shifted from a generally radial or arcuate line by a certain amount of pattern circumferential misalignment (PCM). The disk drive includes a write clock where writing to the data islands is controlled by detection of synchronization marks by the read head, and circuitry to adjust the phase of the write clock to compensate for PCM. The phase difference between the data pattern of the selected data track where data is to be written and the data pattern of the track where the synchronization marks are being detected is the difference in their respective PCM values.

16 Claims, 6 Drawing Sheets

| TRACK #(TR) | SKEW ANGLE (α) | RADIAL OFFSET (Re) | HEAD CIRCUMFERENTIAL OFFSET (HCO) |
|---|---|---|---|
| TR(n) | α(n) | Re(n) | HCO(n) |
| TR(n+10) | α(n+10) | Re(n+10) | HCO(n+10) |
| TR(163b) | α(163b) | Re(163b) | HCO(163b) |
| TR(163a) | α(163a) | Re(163a) | HCO(163a) |
| TR(n+20) | α(n+20) | Re(n+20) | HCO(n+20) |
| TR(n+30) | α(n+30) | Re(n+30) | HCO(n+30) |

| TRACK #(TR) | PCM |
|---|---|
| TR(n) | PCM(n) |
| TR(n+10) | PCM(n+10) |
| TR(163b) | PCM(163b) |
| TR(163a) | PCM(163a) |
| TR(n+20) | PCM(n+20) |
| TR(n+30) | PCM(n+30) |

FIG. 5B

PATTERNED MEDIA MAGNETIC RECORDING DISK DRIVE WITH WRITE CLOCK PHASE ADJUSTMENT FOR DATA PATTERN CIRCUMFERENTIAL MISALIGNMENT

BACKGROUND OF THE INVENTION

1. Field of the Invention

This invention relates generally to magnetic recording disk drives for use with patterned media, wherein each data bit is stored in a magnetically isolated block or island on the disk, and more particularly to such a disk drive with an improved clock for writing the data.

2. Description of the Related Art

Magnetic recording hard disk drives with patterned magnetic recording media have been proposed to increase the data density. In patterned media, the magnetic material on the disk is patterned into small isolated data blocks or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting from a master template or pattern. The magnetic recording layer material is then deposited over the entire surface of the pre-etched substrate to cover both the ends of the pillars and the trenches. The trenches are recessed far enough from the read/write head to not adversely affect reading or writing. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

In patterned media, because the data islands are single-domain, the transitions between bits occur only between the islands. Since the magnetic transitions are restricted to pre-determined locations governed by the locations of individual islands, it is necessary to synchronize the write pulses from the write head with the passing of individual islands under the head. Thus it is important that data island patterns in all the tracks be circumferentially aligned with one another. This alignment is established when the master template or pattern for the disk is produced. This is typically done using a rotary-stage e-beam lithography system, in which the master pattern for the patterned data tracks is produced on a track-by-track basis, or by groups of tracks at a time. Regardless of the manufacturing approach for the master pattern, drifts and offsets in the e-beam machine, which change with time, will result in unknown phase differences between the data island patterns in the different tracks. During the fabrication of the master pattern using a rotary-stage e-beam machine, drifts in the system can cause the beam position to slowly wander relative to its starting position. Since the position of the beam itself cannot be directly measured on a continuous basis, it is not possible to fully correct for all the sources of drift while the pattern is being made. The result of such drift is that as the writing of the pattern progresses from the initial track to the final track, the islands may shift by hundreds of nanometers or even many microns. Thus the data island patterns in the different tracks will be circumferentially misaligned with one another, resulting in the write pulses being out of phase with the data islands.

What is needed is a magnetic recording disk drive with patterned media that has a write-clock with phase adjustment to compensate for circumferential misalignment of the data island patterns.

SUMMARY OF THE INVENTION

The invention relates to a patterned-media magnetic recording disk drive where the data island patterns in the tracks are circumferentially misaligned with one another as a result of errors in fabrication of the master template used to make the disks. Thus each data track on the disk has its pattern shifted from a generally radial or arcuate line by a certain amount of pattern circumferential misalignment (PCM). The disk drive has a read head and a write head located on an air bearing slider associated with each disk surface. There is an effective radial offset between the read head and write head, with the radial offset being a known function of track number, so that when the read head is aligned with one data track the write head is aligned with a different data track. The disk drive includes a write clock where writing to the data islands is controlled by detection of synchronization marks by the read head, and circuitry to adjust the phase of the write clock to compensate for PCM. Thus with the correct phase adjustment, when the read head detects the synchronization marks in the track with which it is aligned, the write clock will cause write pulses to be timed so that the write head will be precisely synchronized with the data islands in the selected data track where data is to be written. The phase difference between the data pattern of the selected data track where data is to be written and the data pattern of the track where the synchronization marks are being detected is the difference in their respective PCM values. In this invention, the PCM values for the tracks are measured on the master pattern and the data stored in a lookup table. Because the master pattern is replicated over large volumes of disks by nanoimprinting, it is only necessary to measure the PCM values once, and provide the same measured data to all disk drives that use disks made from that master pattern.

For a fuller understanding of the nature and advantages of the present invention, reference should be made to the following detailed description taken together with the accompanying figures.

BRIEF DESCRIPTION OF THE DRAWING

FIG. 5B is a lookup table showing PCM values as a function of track number.

DETAILED DESCRIPTION OF THE INVENTION

Figure 1:
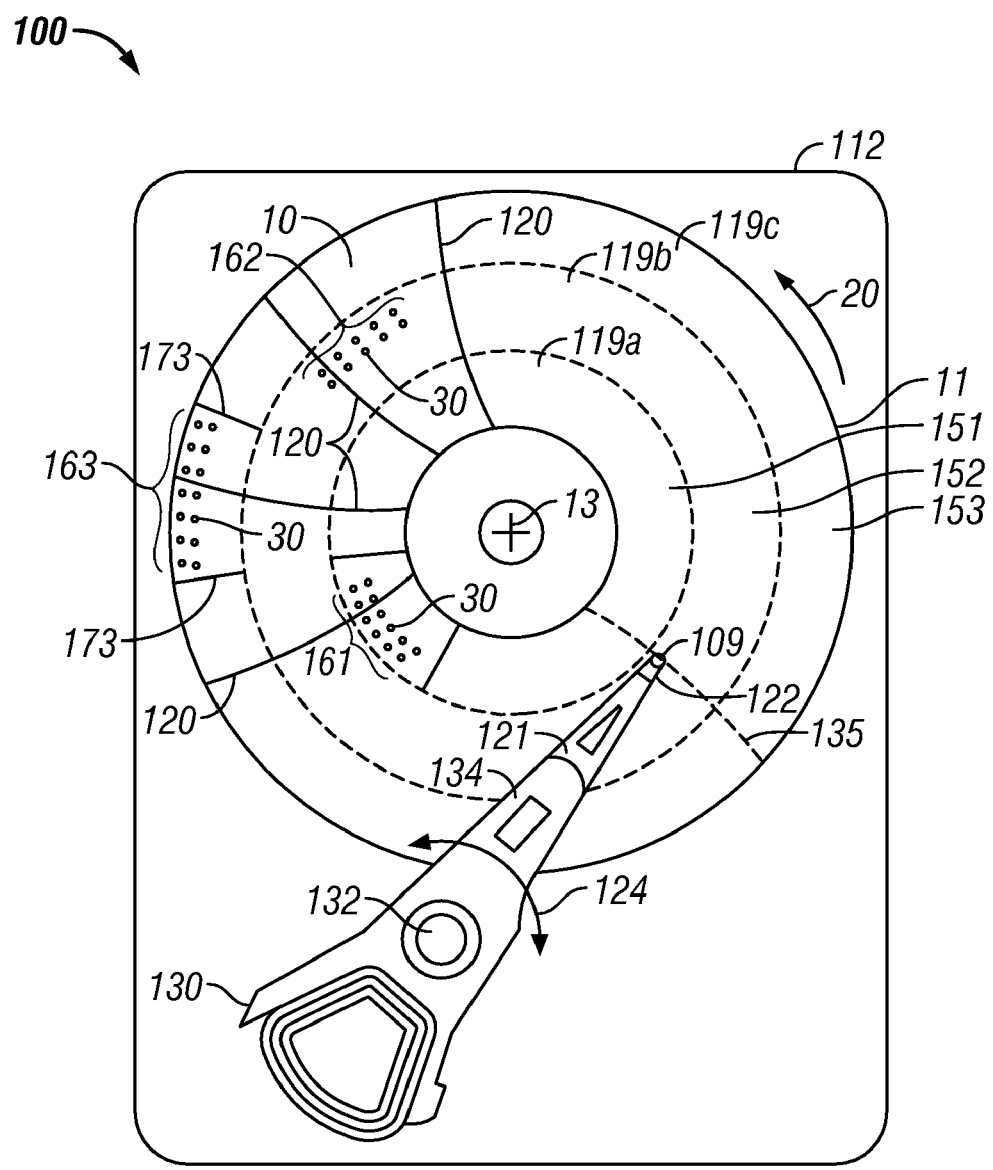
FIG. 1 is a top view of a patterned-media disk drive like that to which the present invention relates.

FIG. 1 is a top view of a patterned-media disk drive 100 like that to which the present invention relates. The drive 100 has a housing or base 112 that supports an actuator 130 and a spindle motor (not shown) for rotating the patterned magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate 11 and discrete data blocks or islands 30 of magnetizable material on the substrate 11. The data islands 30 function as discrete magnetic bits for the storage of data. Each discrete data block 30 is a magnetized block separated from other blocks by nonmagnetic regions or spaces. The term "nonmagnetic" means that the spaces between the data blocks are formed of a nonferromagnetic material, such as a dielectric, or a material that has no substantial remanent moment in the absence of an applied magnetic field, or a magnetic material in a groove or trench recessed far enough below the blocks to not adversely affect reading or writing. The nonmagnetic spaces between the data blocks may also be the absence of magnetic material, such as grooves or troughs in the magnetic recording layer or disk substrate.

The data islands 30 are arranged in radially-spaced circular tracks, with the tracks being grouped into annular bands or zones 151, 152, 153. Within each track, the data islands 30 are typically arranged in fixed-byte-length data sectors (e.g., 512 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical marks 173 in zone 153. Each sync mark 173 may be plurality of circumferentially-spaced marks, with the spacing being different in each zone, that are detected by the read head to enable the write head to be synchronized with the specific spacing of the data islands in that zone. The sync marks may be located in the sector headers for the data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
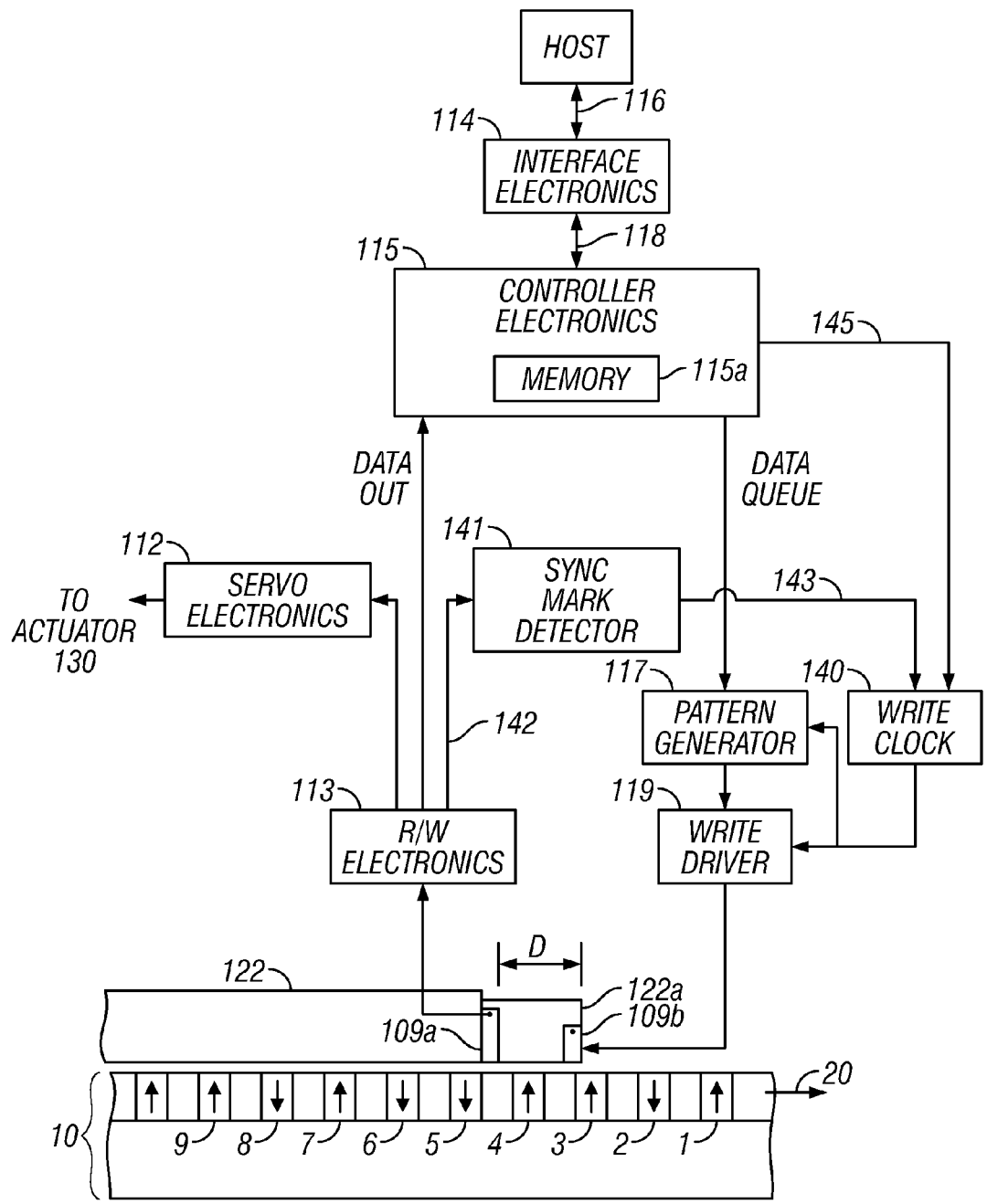
FIG. 2 is a block diagram of the electronics associated with the disk drive of the present invention and also shows a sectional view of the patterned magnetic recording disk.

FIG. 2 is a block diagram of the electronics associated with disk drive 100 and also shows a sectional view of the magnetic recording disk 10 with a magnetic recording layer of patterned media in the form of discrete magnetizable data islands or blocks 1-9. FIG. 2 also shows a portion of slider 122 with read/write head 109 that includes the read element or head 109a and the write element or head 109b. The read head 109a and write head 109b are formed on the trailing end 122a of slider 122. The arrows depicted in the blocks 1-9 represent the magnetic moments or magnetization directions in the blocks, and are depicted for perpendicular or out-of-plane magnetic recording. The recording or writing of data occurs by an inductive coil write head 109b that has a write pole that generates a magnetic field to magnetize the blocks in one of the two magnetization directions, depending on the direction of current through the coil of the write head. Because there is no magnetic material between the blocks 1-9, the write pulses must be precisely timed to magnetize the appropriate blocks. While FIG. 2 illustrates perpendicular patterned media, wherein the blocks 1-9 are depicted with their moments oriented out of the plane of the recording layer, the invention is fully applicable to horizontal or longitudinal patterned media, wherein the blocks 1-9 would have their moments oriented in the plane of the magnetic recording layer.

The disk drive electronics include read/write (R/W) electronics 113, servo electronics 112, controller electronics 115 and interface electronics 114. The R/W electronics 113 receives signals from read head 109a and passes servo information from the servo sectors 120 to servo electronics 112 and data signals from the data sectors to controller electronics 115. Servo electronics 112 typically includes a servo control processor that uses the servo information from the servo sectors 120 to run a control algorithm that produces a control signal. The control signal is converted to a current that drives rotary actuator 130 to position the head 109. Interface electronics 114 communicates with a host system (not shown) over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts them into a set of numbers that uniquely identify the disk surface (head number associated with that disk surface), track and data sector. The numbers are passed to servo electronics 112 to enable positioning head 109 to the appropriate data sector.

FIG. 2 also shows schematically the transfer of data between a host system, such as a PC, and the disk drive 100. The signals from recorded data blocks in the data sectors are detected by read head 109a, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates high-frequency current pulses to the coil of write head 109b which results in the magnetic write fields that magnetize the data blocks 1-9. The write clock 140, which is capable of operating at different frequencies corresponding to the different data zones, outputs a clock signal on line 144 to control the timing of pattern generator 117 and write driver 119. A sync mark detector 141 receives the readback signal from R/W electronics 113 on input line 142 and outputs a signal on line 143 to control the timing of write clock 140. The sync mark detector 141 detects the sync marks (like sync marks 173 in FIG. 1) from R/W electronics 113. The sync mark spacing in each zone is different so sync mark detector 141 enables the write clock 140 to be synchronized with the spacing of the data islands in each of the different zones. FIG. 2 also shows a physical spacing D in the circumferential or along-the-track direction between the read head 109a and the write head 109b.

Figure 3A:
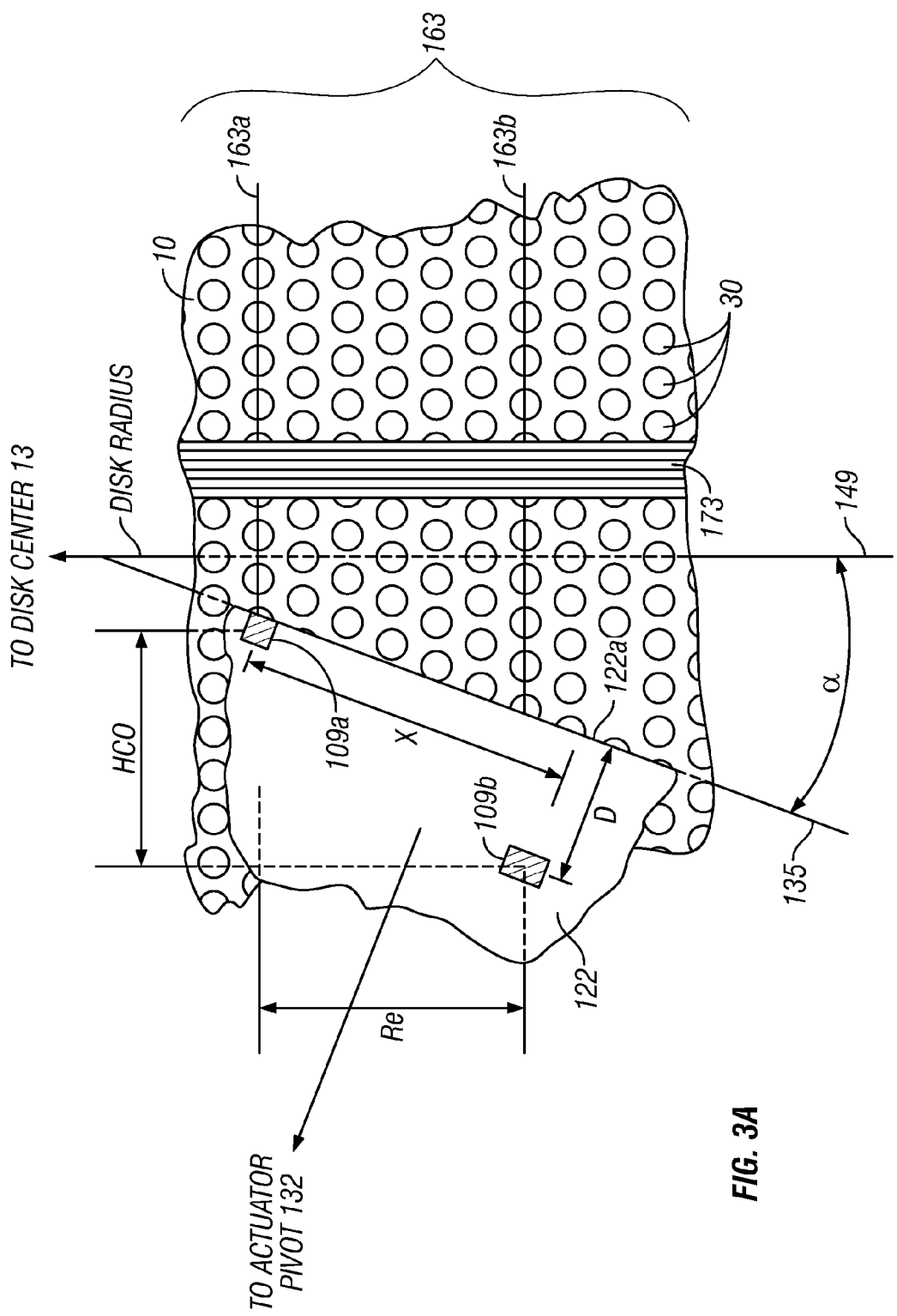
FIG. 3A is a top view of a portion of the slider on a surface of a patterned-media disk and shows the head circumferential offset (HCO) between the read head and write head.
Figures 3B, 4:
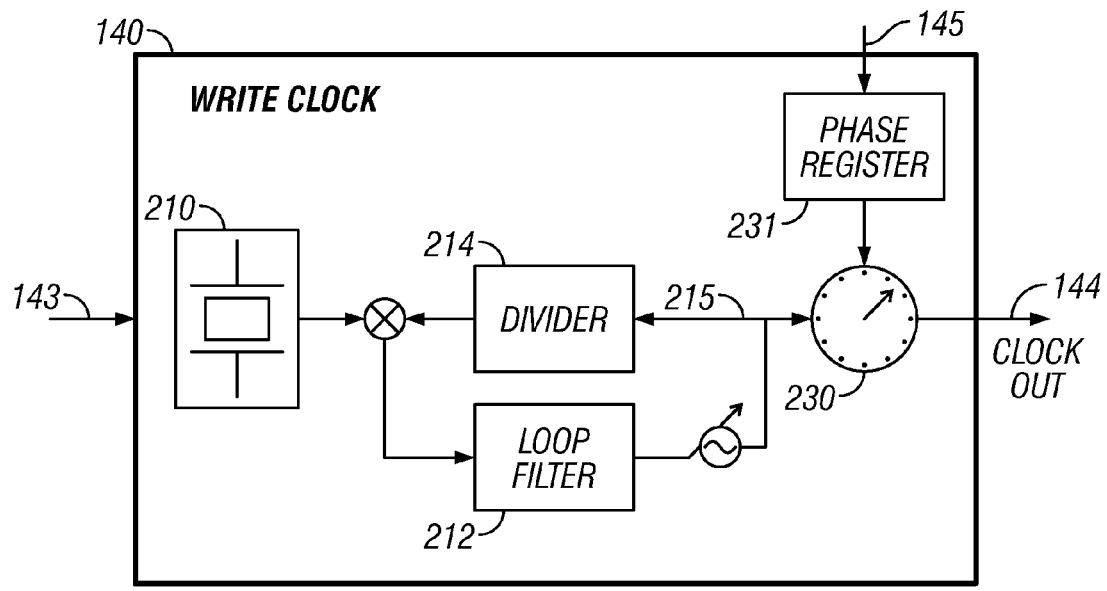
FIG. 3B is a lookup table showing effective radial offset ($R_e$) values and HCO values as a function of track number.
FIG. 4 is a block diagram of the write clock controlled by input from the synchronization (sync) mark detector with phase rotator controlled by input from the controller electronics.

FIG. 3A is a top view of a portion of slider 122 on a surface of patterned-media disk 10 and shows the relationship between the read head 109a, write head 109b and typical patterned data tracks 163 with typical data blocks 30. FIG. 3A shows the physical spacing D in the generally circumferential or along-the-track direction between the read head 109a and the write head 109b. The physical spacing D is typically the same for all heads manufactured in the same fabrication process. Additionally, due to tolerances in fabrication there is typically also a radial or generally cross-track physical spacing X between the read head 109a and write head 109b. The cross-track spacing X is not the same for each head but typically has a statistical variation among the heads in the same fabrication process. Because the slider 122 is mounted to the rotary actuator that rotates about pivot 132 its path is an arcuate path 135 that is not aligned with the disk radius 149. As shown in FIG. 3A, the end face 122a of slider 122 makes an angle $\alpha$ (called the skew angle) with the disk radius 149, with skew angle $\alpha$ being a known function of disk radius and thus track number. As a result of the circumferential spacing D, cross-track spacing X and skew angle $\alpha$, there is an effective radial offset $R_e$ between read head 109a and write head 109b, with radial offset $R_e$ being a known function of track number. In a disk drive using patterned media with an areal density around 1 Terabit per square inch, the track pitch (the radial spacing between adjacent tracks) may be in the range of about 25 to 50 nm and the maximum skew angle $\alpha$ may be about 15 degrees. Manufacturing tolerances result in X being between ±1 micron and D is typically about 8 microns. As a result, the maximum $R_e$ may be about 3 microns, or as much as 120 times the track pitch. Conventional approaches exist for measuring the effective read head/write head radial offset $R_e$ as a function of radius in a disk drive and storing this information in the disk drive's drive electronics for track-following control during reading and writing of data. For example, the disk drive may include a lookup table stored in memory 115a accessible by controller electronics 115. FIG. 3B is an example of a portion of a lookup table that shows track numbers (TR) and associated values of skew angle $\alpha$ and radial offset $R_e$ for every $10^{th}$ track between tracks n and n+30. It is typically not necessary for the lookup table to store values of $R_e$ for every track. Values for every N tracks, for example where N is 100 or 1000, can be stored in the lookup table and an interpolation method used to determine the values for a selected track. As an alternative to the use of a lookup table, the processor in controller electronics 115 may calculate $R_e$ for a selected track number from an equation stored in memory 115a, with the equation generated by a curve-fitting algorithm for values of track number and measured $R_e$ values.

This effective radial offset $R_e$ between the read head 109a and write head 109b means that when the write head 109b is positioned to write on a selected track 163b, the read head 109a will be positioned over a different track 163a. As shown in FIG. 3A, this results in a head circumferential offset (HCO) between the read head 109a and the write head 109b. As can be appreciated from FIG. 3A, because the skew angle $\alpha$ varies with disk radius, the value of HCO also varies with disk radius and can be calculated from the known values of D, $\alpha$ and the measured values of X and D. Thus, when the read head 109a detects a sync mark 173, the write head 109b will not be precisely aligned with that sync mark, but will be circumferentially offset by an amount HCO. Thus an adjustment to the phase of write clock 140 must be made to compensate for HCO to assure that the write pulses are synchronized to the location of the data blocks 30 in the selected track 163b.

FIG. 4 is a block diagram of the write clock 140. The write clock 140 may be a voltage-controlled oscillator (VCO) in a conventional phase-locked loop (PLL) with a crystal reference 210 and loop filter 212. The frequency and phase of write clock 140 is initially set by the sync mark detection signal 143 from sync mark detector 141. The divider 214 allows the write clock frequency to be adjusted, for example in multiples of a small fraction of the frequency of the crystal reference 210. This enables the PLL output 215 to be set to different output frequencies depending on the frequency of the data zone containing the selected track where data is to be written. The settings in divider 214 should be selected so the PLL output is as close as possible to the desired write clock frequency to minimize the average size of phase updates at phase rotator 230. The write clock signal is generated in equally-spaced primary phases, and by analog interpolation it is possible to generate clocks with a phase intermediate the primary phases. For example, the clock output at line 144 may be capable of 64 equally-spaced clock phases. The phase rotator 230, also called a "mixer", controls which clock phase is selected for output on line 144.

Also shown in FIG. 4 is the phase adjustment for HCO, shown as input 145 from controller electronics 115 to the phase rotator 230. The controller electronics 115 calculates HCO from the known relationship between HCO and the track number for the selected data track where data is to be written. This can be done by use of a lookup table. The lookup table in FIG. 3B shows values of HCO for every 10th track between tracks TR(n) and TR(n+30), including the selected track TR(163b) where data is to be written and the track TR(163a) where the read head is located for the example of FIG. 3A. Alternatively, the processor in controller electronics 115 may calculate HCO for a selected track number from an equation stored in memory 115a, with the equation generated by a curve-fitting algorithm for values of track number and HCO. The phase adjustment value corresponding to HCO may stored in a phase register 231 for input to phase rotator 230. Thus with the correct phase adjustment, when the read head 109a detects sync marks in its track 163a, the write clock 140 will cause write pulses from write driver 119 to be precisely synchronized with the data blocks in the selected data track 163b.

As shown in FIG. 3A, all the data block patterns in the tracks, including tracks 163a and 163b, are shown as being precisely aligned circumferentially with one another, with no circumferential misalignment, other than an intended one-half block circumferential shift of the patterns in alternate tracks. The advantage of having the data block pattern in each track shifted in the along-the-track direction by one-half the block spacing from the blocks in adjacent tracks is that any readback signal interference from an adjacent track will be out of phase with the readback signal from the track being read, which results in a substantially reduced error rate for the data being read. Also, in FIG. 3A the data blocks are depicted as circular, but the data blocks may have other shapes, including rectangular with different aspect ratios (radial height to circumferential width).

Figure 5A:
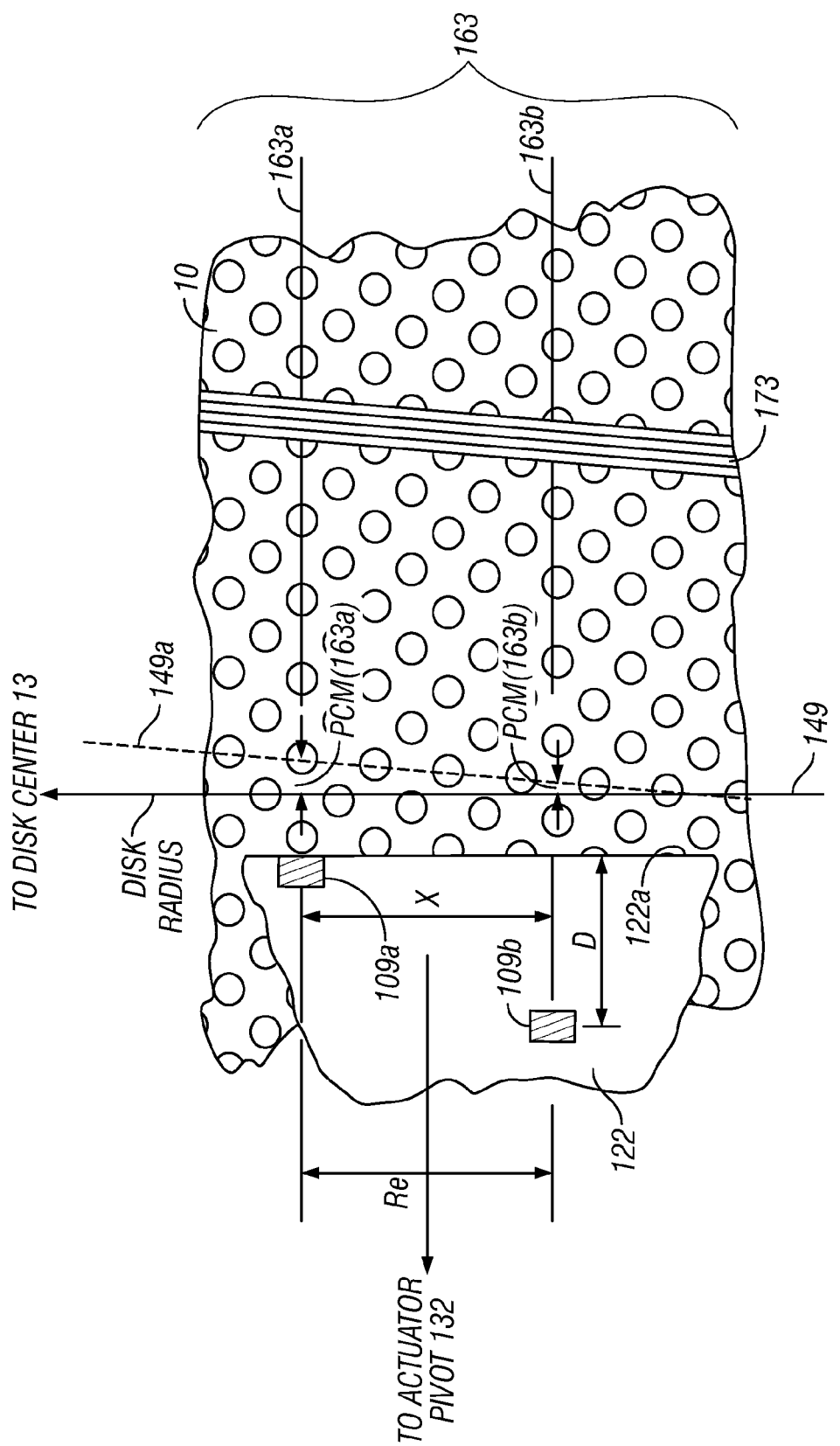
FIG. 5A is a top view of a portion of the slider on a surface of a patterned-media disk and shows the data block pattern circumferential misalignment (PCM) caused by e-beam drift during fabrication of the master pattern.

The circumferential alignment of the data tracks relative to one another is established when the master template or pattern for the disk is produced. This is typically done using a rotary-stage e-beam lithography system, in which the master pattern for the patterned data tracks is produced on a track-by-track basis, or by groups of tracks at a time. Regardless of the manufacturing approach for the master pattern, drifts and offsets in the e-beam machine, which change with time, will result in unknown phase differences between the data patterns in the different tracks. During the fabrication of the master pattern using a rotary-stage e-beam machine, drifts in the system can cause the beam position to slowly wander relative to its starting position. Since the position of the beam itself cannot be directly measured on a continuous basis, it is not possible to fully correct for all the sources of drift while the pattern is being made. The result of such drift is that as the writing of the pattern progresses, pattern features may shift by hundreds of nanometers or even many microns. FIG. 5A shows an example of short-range circumferential misalignment of the data patterns caused by drift in the rotary-stage e-beam machine. In the example of FIG. 5A, the pattern is designed so that every other track would be in phase relative to a generally radial phase reference line, such as line 149. While in FIG. 5A, line 149 is depicted as a radial line for ease of explanation and illustration, line 149 will have an arcuate path, like arcuate path 135 corresponding to the arcuate path of the slider 122, as shown in FIG. 1. Thus if the data block patterns in each track were perfectly aligned circumferentially with one another, then the pattern in each track would be perfectly aligned with this generally radial or arcuate line 149. However, a constant velocity drift of the rotary-stage e-beam machine along the circumferential direction causes this increasing circumferential misalignment from track-to-track, as shown by line 149a.

As shown in FIG. 5A, the read head 109a is located on track 163a, where the data blocks are shifted from line 149 by a certain amount of pattern circumferential misalignment (PCM), and the write head 109b is located on track 163b, where the data blocks are shifted from line 149 by a different amount of PCM. Thus an adjustment to the phase of write clock 140 must be made to compensate for PCM. The phase difference between the data pattern of the selected data track 163b where data is to be written and the data pattern of the track 163a where the sync marks are being detected is the difference in their respective PCM values, i.e., PCM(163b)–PCM(163a). As an example, if the data blocks in the tracks are spaced approximately 20 nm apart and the tracks have a track pitch of about 40 nm, then a drift of 0.2 nm/track in the e-beam while creating the patterns for sequential tracks could result in a maximum PCM value of about 15 nm. Thus for an $R_e$ of about 1 micron, the difference in PCM values between the read head and the write head would be about 5 nm.

In this invention, the PCM values for the tracks are measured on the master pattern and the data stored in a lookup table, for example in memory 115a accessible by controller electronics 115. However, because the master pattern is replicated over large volumes of disks by nanoimprinting, it is only necessary to measure the PCM values once, and provide the same measured data to all disk drives that use disks made from that master pattern. Because the master patterns used for the two different surfaces of the disk might be different, separate measured PCM data can be provided for each disk surface.

One method to measure the PCM of the tracks in the master pattern is to directly measure the patterns using a tool like a scanning electron microscope (SEM) or atomic force microscope (AFM) that has accuracy in the nanometer range. Nanometer-scale accuracy is required because the island spacing for patterned media is on the order of about 10 nm, and the write synchronization needs to be controlled to a small fraction of the island period. Another PCM measurement method is to make write synchronization measurements on a disk made with the master pattern using a read/write head with known physical offsets, i.e., known values of D and X. The write head 109b then writes on the write track 163b with a specific phase relative to a defined mark on the read track 163a, but with a frequency slightly shifted with respect to the known island period of the write track 163b. A slightly shifted frequency is equivalent to a constantly shifting phase. The written track is then read back. By reading back which regions of the track show good synchronization (i.e., low bit error rate) and which regions show poor synchronization (i.e., high bit error rate), the optimal phase relationship between the written track and the track the read head is on can be determined. This optimal phase corresponds to the desired phase adjustment for that particular track, which would be the difference between the PCM values of track 163b and track 163a in the example shown in FIG. 5A.

The lookup table in FIG. 5B shows the measured values of PCM for every $10^{th}$ track between tracks TR(n) and TR(n+30), including the selected track TR(163b) where data is to be written and the track TR(163a) where the read head is located for the example of FIG. 5A. The processor in controller electronics 115 uses the lookup table in FIG. 5B to calculate a PCM value to output on line 145 to adjust the phase of write clock 140. However, unlike the example of FIG. 3A wherein a different table like that in FIG. 3B is required for each read/write head in each disk drive, in the example of FIG. 5A the table in FIG. 5B can be the same for all disk drives that use disks made from the same master pattern. When the controller 115 receives a request to write to a selected data track, for example track 163b, it recalls the PCM value for that track from the table in FIG. 3A, i.e., PCM(163b) in the table of FIG. 5B. It then looks in the table of FIG. 3B for the value of $R_e(163b)$ associated with track TR(163b). It then sums (adds or subtracts depending on the relative position of read head 109a and write head 109b on slider 122) the value of $R_e(163b)$ (in units of tracks) to track TR(163b). This newly calculated track thus corresponds to track TR(163a). The controller 115 then looks up in the table of FIG. 5B the value of PCM associated with track TR(163a). The difference in these two PCM values, PCM(163b)−PCM(163a), is the required phase adjustment. Thus with the correct phase adjustment, when the read head 109a detects the sync mark 173 in its track 163a, the write clock 140 will cause write pulses from write driver 119 to be precisely timed so that the write head 109b will be precisely synchronized with the data blocks in the selected data track 163b.

In the example of FIG. 5A, the slider 122 is depicted at zero skew angle for ease in explaining the phase misalignment problem associated with PCM. At zero skew angle, $R_e$ is equal to X, the physical cross-track spacing between read head 109a and write head 109b. However, because the skew angle and thus the value of $R_e$ is a function of radial position or track number, the controller electronics 115 must adjust the phase of the write clock for both HCO and PCM. Thus the signal on line 145 is the sum of the calculated adjustments required for both HCO and PCM.

It is also within the scope of the invention to combine the lookup tables in FIGS. 3B and 5B into a single lookup table. Additionally, the data in the lookup tables may be curve-fit to generate an equation that is recalled from memory and run to calculate the required HCO and PCM values.

The write synchronization system and method as described above and illustrated with various block diagrams may be implemented in conventional analog or digital hardware components or in software. The servo control processor, the processor in the controller electronics, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
 a rotatable magnetic recording disk having a plurality of generally circular data tracks and a plurality of angularly spaced synchronization marks extending generally radially across the data tracks, each data track patterned into discrete magnetizable data blocks, wherein the pattern of data blocks in a plurality of the data tracks is circumferentially misaligned;
 a controller for selecting a data track where data is to be written;
 a write head for writing data to a selected data track by generating write pulses to magnetize the data blocks in said selected data track;
 a write clock coupled to the write head for controlling the write pulses to the data blocks;
 a read head for sensing the synchronization marks;
 synchronization mark detection circuitry coupled to the read head for controlling the write clock; and
 phase adjustment circuitry responsive to the selected data track for adjusting the phase of the write clock to thereby correct for circumferential misalignment of the pattern of data blocks in said selected data track.

2. The disk drive of claim 1 wherein the value of data block pattern circumferential misalignment is a function of data track number and wherein the controller calculates the phase adjustment from the number of said selected data track.

3. The disk drive of claim 2 further comprising memory accessible by the controller, the memory containing a table of data track numbers and associated data block pattern circumferential misalignment values, and wherein the controller recalls from said table the data block pattern circumferential misalignment value associated with the data track number for said selected data track.

4. The disk drive of claim 1 wherein the read head is radially offset from the write head, each data track having an associated head radial offset value, and wherein the phase adjustment circuitry is responsive to the head radial offset value associated with said selected data track.

5. The disk drive of claim 4 wherein the value of data block pattern misalignment is a function of data track number and wherein the controller calculates the phase adjustment by calculating the difference in circumferential misalignment between the data block pattern of said selected data track and the data block pattern of the data track radially spaced from said selected data track by the value of the head radial offset associated with said selected data track.

6. The disk drive of claim 1 wherein the read head and write head are circumferentially offset from each other, each data track having an associated head circumferential offset value, and wherein the phase adjustment circuitry is responsive to the head circumferential offset associated with said selected data track.

7. The disk drive of claim 1 wherein the write clock has adjustable phases and the phase adjustment circuitry comprises a phase register, and wherein the phase of the write clock is adjusted by the value in said phase register.

8. The disk drive of claim 1 wherein the disk has generally equally angularly spaced servo sectors extending generally radially across the data tracks and containing positioning information for positioning the read head and write head on the data tracks, and wherein the synchronization marks are located within the servo sectors.

9. The disk drive of claim 1 wherein the data tracks are grouped into a plurality of radially spaced bands, and wherein the write clock frequency is unique for each of the bands.

10. A method for synchronizing the writing of data on discrete magnetizable data blocks of a patterned-media disk drive, the disk drive having (a) a rotatable magnetic recording disk having a plurality of generally circular data tracks and a plurality of angularly spaced synchronization marks extending generally radially across the data tracks, each data track patterned into discrete magnetizable data blocks wherein the pattern of data blocks in a plurality of the data tracks is circumferentially misaligned; (b) a write head for generating write pulses to magnetize the data blocks; (c) a write clock coupled to the write head for controlling the write pulses to the data blocks; (d) a read head for sensing the synchronization marks; (e) a processor for receiving synchronization mark signals from the read head and generating a phase adjustment signal to the write clock; and (f) memory coupled to the processor and containing a program of instructions readable by the processor; the processor-implemented method comprising:

identifying the selected data track on which data is to be written;

generating, from the selected data track, a write clock phase adjustment value representing the circumferential misalignment of the data block pattern in said selected track; and transmitting to the write clock a phase adjustment signal representing said phase adjustment value.

11. The method of claim 10 wherein the memory contains a table of data track numbers and associated data block pattern circumferential misalignment values, and wherein generating a write clock phase adjustment value comprises recalling from said table the data block pattern circumferential misalignment value associated with the data track number for said selected data track.

12. The method of claim 10 wherein the read head is radially offset from the write head, each data track having an associated head radial offset value, and wherein generating said write clock phase adjustment value further comprises generating said write clock phase adjustment value from the head radial offset value associated with said selected data track.

13. The method of claim 12 wherein generating said write clock phase adjustment value comprises calculating the difference in circumferential misalignment between the data block pattern of the selected data track and the data block pattern of the data track radially spaced from said selected data track by the value of the head radial offset associated with said selected data track.

14. The method of claim 10 wherein the read head and write head are circumferentially offset from each other, each data track having an associated head circumferential offset value, and wherein the processor-implemented method further comprises generating, from the selected data track, a write clock phase adjustment value representing the head circumferential offset associated with said selected data track.

15. The method of claim 10 wherein the disk has generally equally angularly spaced servo sectors extending generally radially across the data tracks and containing positioning information for positioning the read head and write head on the data tracks, and wherein the synchronization marks are located within the servo sectors.

16. The method of claim 10 wherein the data tracks are grouped into a plurality of radially spaced bands, wherein the write clock frequency is unique for each of the bands, and wherein the method steps of identifying, generating and transmitting are performed in each of said bands.

* * * * *